United States Patent
Wu et al.

(10) Patent No.: US 10,520,709 B1
(45) Date of Patent: Dec. 31, 2019

(54) PROJECTION SYSTEM

(71) Applicants: SUN YANG OPTICS DEVELOPMENT CO., LTD., Taoyuan (TW); SHENZHEN ANHUA OPTOELECTRONICS TECHNOLOGY CO., LTD., Shenzhen (CN)

(72) Inventors: Sheng-Che Wu, Taoyuan (TW); Yu-Hung Chou, Taoyuan (TW); Wei-Hao Huang, Taoyuan (TW)

(73) Assignees: Sun Yang Optics Development Co., Ltd., Taoyuan (TW); Shenzhen Anhua Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/142,239

(22) Filed: Sep. 26, 2018

(51) Int. Cl.
*G02B 13/16* (2006.01)
*G02B 13/18* (2006.01)
*G03B 21/00* (2006.01)
*G03B 21/28* (2006.01)

(52) U.S. Cl.
CPC ............ *G02B 13/16* (2013.01); *G02B 13/18* (2013.01); *G03B 21/008* (2013.01); *G03B 21/28* (2013.01)

(58) Field of Classification Search
CPC ...... G03B 21/008; G03B 21/28; G03B 21/14; G03B 21/208; G02B 13/16; G02B 13/18; G02B 13/0045; G02B 13/0065
See application file for complete search history.

(56) References Cited

U.S. PATENT DOCUMENTS

| | | | | |
|---|---|---|---|---|
| 6,264,333 | B1* | 7/2001 | Iizuka | G03B 21/28 348/771 |
| 2004/0233547 | A1* | 11/2004 | Sugano | G02B 13/04 359/784 |
| 2015/0301320 | A1* | 10/2015 | Lin | G02B 15/177 359/680 |
| 2017/0059971 | A1* | 3/2017 | Takano | G02B 13/16 |
| 2017/0276916 | A1* | 9/2017 | Inoue | G02B 13/04 |
| 2019/0121093 | A1* | 4/2019 | Gong | G02B 13/0045 |

* cited by examiner

*Primary Examiner* — Sultan Chowdhury
(74) *Attorney, Agent, or Firm* — Rosenberg, Klein & Lee

(57) ABSTRACT

A projection system includes a long-focus lens that is able to generate an image independently with a focal length between 70-300 mm, a short-focus lens that is able to generate an image independently with a focal length between 3-8 mm and shares an optical axis with the long-focus lens and at least one reflector to reflect the optical axis for direction change. When the long-focus lens generates an image, the short-focus lens then generates the image to a pre-determined position thereby.

11 Claims, 14 Drawing Sheets

PROJECTION SYSTEM

BACKGROUND OF THE INVENTION

1. Field of the Invention

The present invention relates to a projection system, particularly to one that has a long-focus lens and a short-focus lens operated together to project images to a screen within a short distance.

2. Description of the Related Art

Projectors have been innovated with latest technology for the past years, ranging from projectors with normal focal lengths to ones with short focal lengths. They can be applied in many aspects like multimedia presentations, television projection, family cinemas, teleconferences . . . , etc. In recent years, projectors with short focal lengths are mainly applied in educational fields and are favorable in small families.

In view of the quality of the projected images, the longer the focal lengths are, the narrower the angle of the field of view the projectors have, and as the focal lengths become shorter, the distortion of the images gets worse. So it is impossible to guarantee the quality of the images with the focal lengths reduced. Therefore, it is desirable to make an arrangement of the structures of the projectors to achieve greater efficiency in projections while ensuring the quality of the projected images.

SUMMARY OF THE INVENTION

A primary objective of the present invention is to provide a projection system that has a short-focus lens and a long-focus lens coordinating in operation to shorten a projection distance of an applied device and meanwhile provide images with better quality.

Another objective of the present invention is to provide a projection system that has a reflector to change a direction of an optical axis of a short-focus lens and a long-focus lens, thereby to provide an efficient operation.

Yet another objective of the present invention is to provide a projection system that integrates a long-focus lens, a short-focus lens and a reflector within a housing case.

To achieve the objects mentioned above, the present invention comprises a long-focus lens able to generate an image independently, having a focal length ranging from 70 to 300 mm; a short-focus lens able to generate an image independently, having a focal length ranging from 3 to 8 mm and sharing an optical axis with said long-focus lens; and at least one reflector to change an direction of said optical axis, thereby said long-focus lens generating an image and then said short-focus lens generating said image to a pre-determined position.

Furthermore, the optical axis is reflected by the reflector with an angle less than or equal to 90°. The short-focus lens includes a plurality of lenses from a first lens to a last lens, both the first and the last lenses being aspheric lenses.

In addition, the short-focus lens includes a second lens, a third lens, a fourth lens and a fifth lens disposed between the first and last lenses, said lenses having a radius on each surface, a thickness, refraction rate and an Abbe number according to following specification:

| Surface no. | Radius (mm) | Thickness (mm) | Refraction rate | Abbe number |
|---|---|---|---|---|
| $11R_1$ | −38.79 | 5.00 | 1.53 | 56.3 |
| $11R_2$ | 12.68 | 6.25 | | |
| $12R_1$ | 20.59 | 2.00 | 1.92 | 18.9 |
| $12R_2$ | 13.60 | 15.48 | | |
| $13R_1$ | −11.30 | 5.46 | 1.69 | 52.7 |
| $13R_2$ | −12.01 | 0.20 | | |
| $14R_1$ | 46.03 | 8.88 | 1.50 | 81.6 |
| $14R_2$ | −46.03 | 0.20 | | |
| $15R_1$ | 36.91 | 5.57 | 1.85 | 23.8 |
| $15R_2$ | 84.40 | 0.38 | | |
| $16R_1$ | 11.91 | 7.20 | 1.53 | 56.3 |
| $16R_2$ | 28.68 | 11.85 | | |

Still, the long-focus lens includes an aperture stop, at least a first doublet and at least a second doublet, said at least first and second doublet disposed at a rear side of said long-focus lens. The long-focus lens has a first lens and a second lens disposed at a front side thereof; the first doublet includes a third lens and a fourth lens of the long-focus lens; the second doublet includes a fifth lens, a sixth lens and a seventh lens of the long-focus lens and has a third doublet disposed at a rear side of the second doublet, said third doublet including an eighth lens, ninth lens and a tenth lens of said long-focus lens and further having an eleventh lens of said long-focus lens disposed at a rear side of said third doublet, said first, second, third, fourth, fifth, sixth, seventh, eighth, ninth, tenth and eleventh lenses having a radius on each surface, a thickness, refraction rate and an Abbe number according to following specification:

| Surface no. | Radius (mm) | Thickness (mm) | Refraction rate | Abbe number |
|---|---|---|---|---|
| $21R_1$ | 88.32 | 6.50 | 1.77 | 49.6 |
| $21R_2$ | −88.32 | 0.20 | | |
| $22R_1$ | 36.00 | 8.00 | 1.85 | 23.8 |
| $22R_2$ | 49.65 | 22.20 | | |
| $23R_1$ | −15.28 | 8.00 | 1.83 | 37.2 |
| $24R_1$ | −97.90 | 5.55 | 1.51 | 63.9 |
| $24R_2$ | −12.89 | 0.20 | | |
| $25R_1$ | 32.49 | 1.00 | 1.85 | 23.8 |
| $26R_1$ | 18.18 | 6.25 | 1.50 | 81.6 |
| $27R_1$ | −18.18 | 1.00 | 1.81 | 25.5 |
| $27R_2$ | 37.03 | 0.20 | | |
| $28R_1$ | 17.75 | 4.28 | 1.50 | 81.6 |
| $29R_1$ | 49.08 | 1.00 | 1.81 | 25.5 |
| $210R_1$ | 13.84 | 7.58 | 1.50 | 81.6 |
| $210R_2$ | 79.84 | 0.20 | | |
| $211R_1$ | 33.66 | 5.22 | 1.92 | 18.9 |
| $211R_2$ | −85.20 | 3.35 | | |

The short-focus lens has a maximum angle of view less than or equal to 130°. The long-focus lens has an f-number between 1.7-2.0 and an optical magnification between 1.5-2.5.

A digital micromirror device is further combined with the projection system for the digital micromirror device to generate an image by the long-focus lens and to be a source of image for the short-focus lens by the generated image; the reflector is disposed correspondingly to a length or a width of the digital micromirror device.

With structures disclosed above, the present invention has the short-focus lens and long-focus lens operated correspondingly to reduce the distance for projection as well as remain quality of the projected images. Meanwhile, the reflector is designed to change the direction of the optical axis of the long-focus lens and the short-focus lens, so as to make arrangement of the structure with better efficiency. The housing case also integrated the long-focus lens, the short-focus lens and the reflector to make the present invention suitable for projectors with super short projection distance.

DETAILED DESCRIPTION OF THE PREFERRED EMBODIMENT

Referring to FIGS. 1-10, a preferred embodiment of the present invention mainly comprises a long-focus lens $L_2$, a short-focus lens $L_1$ and at least one reflector B. Both the short-focus lens $L_1$ and the long-focus lens $L_2$ are able to generate images independently.

The long-focus lens $L_2$ has a focal length ranging from 70 to 300 mm and the short-focus lens $L_1$ has a focal length ranging from 3 to 8 mm and shares an optical axis O with the long-focus lens $L_2$. In this embodiment, the long-focus lens $L_2$ has a focal length of 102.03 mm and the short-focus lens $L_1$ has a focal length of 5.38 mm, but the present invention is not limited to such application.

The at least one reflector B is designed to change an direction of the optical axis O; the long-focus lens $L_2$ thereby generates an image and then the short-focus lens $L_1$ generates the image to a pre-determined position. In this embodiment, the long-focus lens $L_2$ has an optical axis $O_2$ and the short-focus lens has an optical axis $O_1$; when the short-focus lens $L_1$ and the long-focus lens $L_2$ are combined, the optical axis O is formed. But the present invention is not limited to such application.

Furthermore, the short-focus lens $L_1$ includes a plurality of lenses from a first lens 11 to a last lens 16; both the first and the last lenses 11, 16 are aspheric lenses. The short-focus lens $L_1$ has a maximum angle of view less than or equal to 130°; in this embodiment, the maximum angle of view of the short-focus lens $L_1$ is 143.83°, but the present invention is not limited to such application.

Figure 1A:
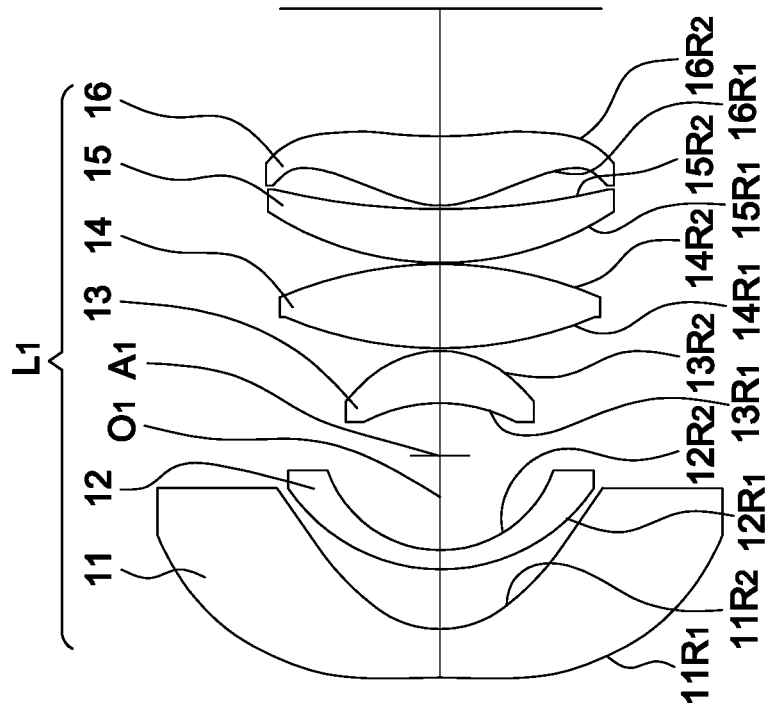
FIG. 1A is a schematic diagram illustrating lenses arrangement of a short-focus lens according to the present invention.
Figure 1B:
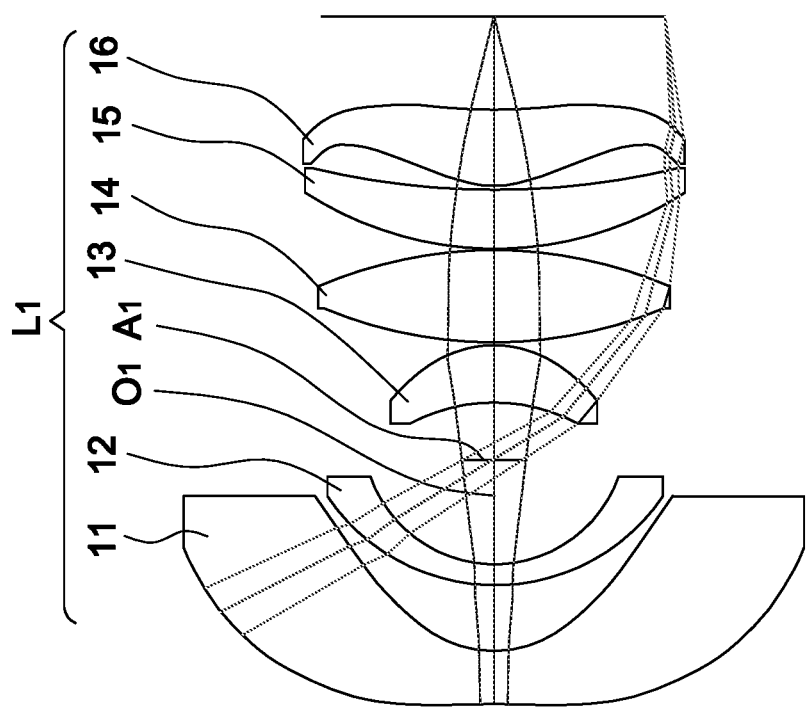
FIG. 1B is a schematic diagram illustrating a travel path of light beams through the short-focus lens according to the present invention.

With reference to FIGS. 1A and 1B, the short-focus lens $L_1$ includes a second lens 12, an aperture stop $A_1$, a third lens 13, a fourth lens 14 and a fifth lens 15 disposed between the first and the last lenses 11, 16. The lenses each has a radius on each surface, a thickness, refraction rate and an abbe number according to the following specification:

| Surface no. | Radius (mm) | Thickness (mm) | Refraction rate | Abbe number |
|---|---|---|---|---|
| $11R_1$ | −38.79 | 5.00 | 1.53 | 56.3 |
| $11R_2$ | 12.68 | 6.25 | | |
| $12R_1$ | 20.59 | 2.00 | 1.92 | 18.9 |
| $12R_2$ | 13.60 | 10.00 | | |
| $A_1$ | INF | 5.48 | | |
| $13R_1$ | −11.30 | 5.46 | 1.69 | 52.7 |
| $13R_2$ | −12.01 | 0.20 | | |
| $14R_1$ | 46.03 | 8.88 | 1.50 | 81.6 |
| $14R_2$ | −46.03 | 0.20 | | |
| $15R_1$ | 36.91 | 5.57 | 1.85 | 23.8 |
| $15R_2$ | 84.40 | 0.38 | | |
| $16R_1$ | 11.91 | 7.20 | 1.53 | 56.3 |
| $16R_2$ | 28.68 | 11.85 | | |

In the table above, the $11R_1$ is the projecting surface of the first lens 11 of the short-focus lens $L_1$ and the $11R_2$ is the image inputting surface of the first lens 11 of the short-focus lens $L_1$. The $12R_1$ is the projecting surface of the second lens 12 of the short-focus lens $L_1$ and the $12R_2$ is the image inputting surface of the second lens 12 of the short-focus lens $L_1$. The $13R_1$ is the projecting surface of the third lens 13 of the short-focus lens $L_1$ and the $13R_2$ is the image inputting surface of the third lens 13 of the short-focus lens $L_1$. The $14R_1$ is the projecting surface of the fourth lens 14 of the short-focus lens $L_1$ and the $14R_2$ is the image inputting surface of the fourth lens 14 of the short-focus lens $L_1$. The $15R_1$ is the projecting surface of the fifth lens 15 of the short-focus lens $L_1$ and the $15R_2$ is the image inputting surface of the fifth lens 15 of the short-focus lens $L_1$. The $16R_1$ is the projecting surface of the last lens 16 of the short-focus lens $L_1$ and the $16R_2$ is the image inputting surface of the last lens 16 of the short-focus lens $L_1$.

In addition, the following table displays the radius, the conic value and order aspheric coefficients of the projecting surface $11R_1$ of the first lens 11 of the short-focus lens $L_1$ and the image inputting surface $11R_2$ of the first lens 11 of the short-focus lens $L_1$.

| Aspheric lens | $11R_1$ | $11R_2$ |
|---|---|---|
| Radius | −38.79 | 12.68 |
| Conic | — | −0.79 |
| 3th | 1.74E−03 | 5.80E−04 |
| 4th | −4.54E−05 | 8.86E−06 |
| 5th | 2.81E−07 | −3.42E−07 |
| 6th | 9.58E−09 | −9.58E−08 |
| 7th | 2.27E−10 | 9.95E−10 |

-continued

| Aspheric lens | $11R_1$ | $11R_2$ |
|---|---|---|
| 8th | 2.14E−12 | 3.54E−10 |
| 9th | −9.49E−14 | −1.58E−11 |
| 10th | −1.19E−14 | −1.33E−12 |
| 11th | 4.74E−17 | 6.73E−15 |
| 12th | 8.30E−18 | 2.40E−15 |

The following table displays the radius, the conic value and order aspheric coefficients of the projecting surface $13R_1$ of the third lens 13 of the short-focus lens $L_1$, the image inputting surface $13R_2$ of the third lens 13 of the short-focus lens $L_1$, the projecting surface $16R_1$ of the last lens 16 of the short-focus lens $L_1$ and the image inputting surface $16R_2$ of the last lens 16 of the short-focus lens $L_1$.

| Aspheric lens | $13R_1$ | $13R_2$ | $16R_1$ | $16R_2$ |
|---|---|---|---|---|
| Radius | −11.30 | −12.01 | 11.91 | 28.68 |
| Conic | −0.63 | −0.70 | −0.67 | 0.00 |
| 4th | 4.01E−04 | −1.50E−04 | −2.23E−04 | −2.06E−04 |
| 6th | −3.26E−06 | 1.03E−06 | 6.92E−07 | 9.79E−07 |
| 8th | 2.27E−08 | 1.06E−10 | −1.70E−09 | −2.45E−09 |
| 10th | −7.84E−11 | −9.27E−12 | 8.39E−13 | 2.05E−12 |

On the other hand, the long-focus lens $L_2$ includes an aperture stop $A_2$, at least a first doublet $C_1$ and at least a second doublet $C_2$; the at least one first doublet $C_1$ and at least one second doublet $C_2$ are disposed at a rear side of the long-focus lens $L_2$. The long-focus lens $L_2$ has an f-number between 1.7-2.0 and an optical magnification between 1.5-2.5. In another embodiment, the f-number is 1.9 and the optical magnification is 2.04, but it is not limited to such application.

Figure 2A:
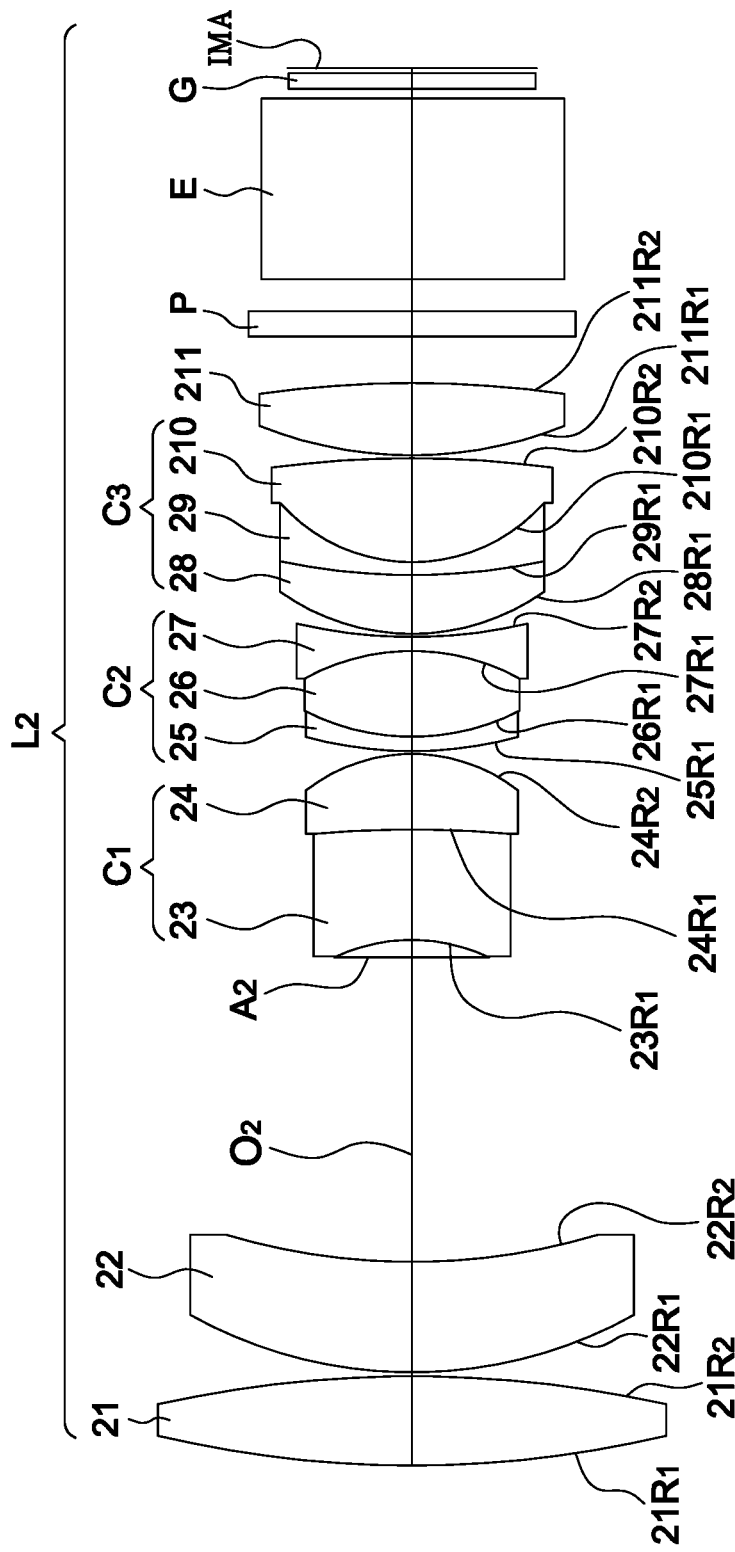
FIG. 2A is a schematic diagram illustrating lenses arrangement of a long-focus lens according to the present invention.
Figure 2B:
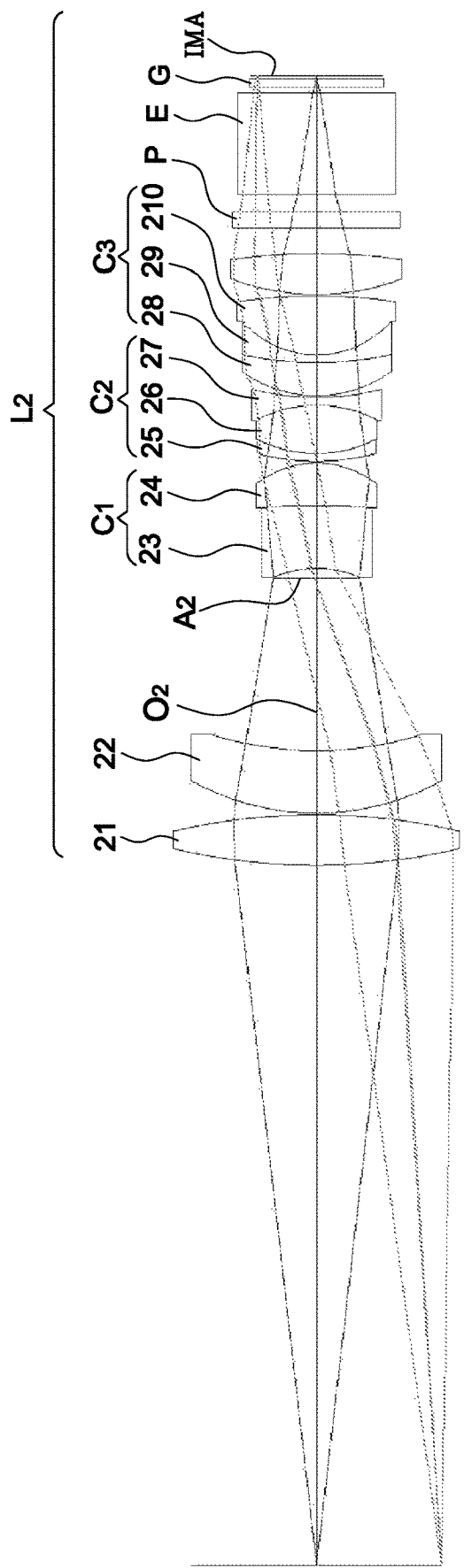
FIG. 2B is a schematic diagram illustrating a travel path of light beams through the long-focus lens according to the present invention.

Referring to FIGS. 2A and 2B, the long-focus lens $L_2$ has a first lens 21 and a second lens 22 disposed at a front side thereof. The first doublet $C_1$ includes a third lens 23 and a fourth lens 24 of the long-focus lens $L_2$; and the second doublet $C_2$ includes a fifth lens 25, a sixth lens 26 and a seventh lens 27 of the long-focus lens $L_2$ and has a third doublet $C_3$ disposed at a rear side of the second doublet $C_2$. The third doublet $C_3$ includes an eighth lens 28, ninth lens 29 and a tenth lens 210 of the long-focus lens $L_2$ and further has an eleventh lens 211 of the long-focus lens $L_2$ disposed at a rear side of the third doublet $C_3$. The first, second, third, fourth, fifth, sixth, seventh, eighth, ninth, tenth and eleventh lenses 21, 22, 23, 24, 25, 26, 27, 28, 29, each has a radius on each surface, a thickness, refraction rate and an Abbe number according to following specification:

| Surface no. | Radius (mm) | Thickness (mm) | Refraction rate | Abbe number |
|---|---|---|---|---|
| $21R_1$ | 88.32 | 6.50 | 1.77 | 49.6 |
| $21R_2$ | −88.32 | 0.20 | | |
| $22R_1$ | 36.00 | 8.00 | 1.85 | 23.8 |
| $22R_2$ | 49.65 | 22.20 | | |
| $A_2$ | INF | 1.30 | | |
| $23R_1$ | −15.28 | 8.00 | 1.83 | 37.2 |
| $24R_1$ | −97.90 | 5.55 | 1.51 | 63.9 |
| $24R_2$ | −12.89 | 0.20 | | |
| $25R_1$ | 32.49 | 1.00 | 1.85 | 23.8 |
| $26R_1$ | 18.18 | 6.25 | 1.50 | 81.6 |
| $27R_1$ | −18.18 | 1.00 | 1.81 | 25.5 |
| $27R_2$ | 37.03 | 0.20 | | |
| $28R_1$ | 17.75 | 4.28 | 1.50 | 81.6 |
| $29R_1$ | 49.08 | 1.00 | 1.81 | 25.5 |

-continued

| Surface no. | Radius (mm) | Thickness (mm) | Refraction rate | Abbe number |
|---|---|---|---|---|
| $210R_1$ | 13.84 | 7.58 | 1.50 | 81.6 |
| $210R_2$ | 79.84 | 0.20 | | |
| $211R_1$ | 33.66 | 5.22 | 1.92 | 18.9 |
| $211R_2$ | −85.20 | 3.35 | | |

In the table above, the $21R_1$ is the projecting surface of the first lens 21 of the long-focus lens $L_2$ and the $21R_2$ is the image inputting surface of the first lens 21 of the long-focus lens $L_2$. The $22R_1$ is the projecting surface of the second lens 22 of the long-focus lens $L_2$ and the $22R_2$ is the image inputting surface of the second lens 22 of the long-focus lens $L_2$. The $23R_1$ is the projecting surface of the third lens 23 of the long-focus lens $L_2$. The $24R_1$ is the projecting surface of the fourth lens 24 of the long-focus lens $L_2$ and the $24R_2$ is the image inputting surface of the fourth lens 24 of the long-focus lens $L_2$. The $25R_1$ is the projecting surface of the fifth lens 25 of the long-focus lens $L_2$. The $26R_1$ is the projecting surface of the sixth lens 26 of the long-focus lens $L_2$. The $27R_1$ is the projecting surface of the seventh lens 27 of the long-focus lens $L_2$ and the $27R_2$ is the image inputting surface of the seventh lens 27 of the long-focus lens $L_2$. The $28R_1$ is the projecting surface of the eighth lens 28 of the long-focus lens $L_2$. The $29R_1$ is the projecting surface of the ninth lens 23 of the long-focus lens $L_2$. The $210R_1$ is the projecting surface of the tenth lens 210 of the long-focus lens $L_2$ and the $210R_2$ is the image inputting surface of the seventh lens 210 of the long-focus lens $L_2$. The $211R_1$ is the projecting surface of the tenth lens 211 of the long-focus lens $L_2$ and the $211R_2$ is the image inputting surface of the seventh lens 211 of the long-focus lens $L_2$.

In addition, the following table displays the radius, the conic value and order aspheric coefficients of the projecting surface $24R_1$ of the fourth lens 24 of the long-focus lens $L_2$ and the image inputting surface $24R_2$ of the fourth lens 24 of the long-focus lens $L_2$.

| Aspheric lens | $24R_1$ | $24R_2$ |
|---|---|---|
| Radius | −97.90 | −12.89 |
| Conic | 0.00 | −0.20 |
| 4th | 0.00E+00 | 2.62E−05 |
| 6th | 0.00E+00 | 7.73E−08 |
| 8th | 0.00E+00 | −2.11E−10 |
| 10th | 0.00E+00 | 3.56E−12 |

Still, a transmissive smooth picture actuator P is disposed at a rear side of the eleventh lens 211 of the long-focus lens $L_2$. The transmissive smooth picture actuator P is a glass tablet device which is able to rotate rapidly to enhance the resolution by image-shifts. In this way, an image with 1080P resolution can be enhanced to 4K2K resolution. An optical element E is disposed at a rear of the transmissive smooth picture actuator P. In this embodiment, the optical element E is a prism, and a cover glass and an image IMA of a digital micromirror device 30 are disposed behind the prism; but the present invention is not limited to this application.

Figure 3A:
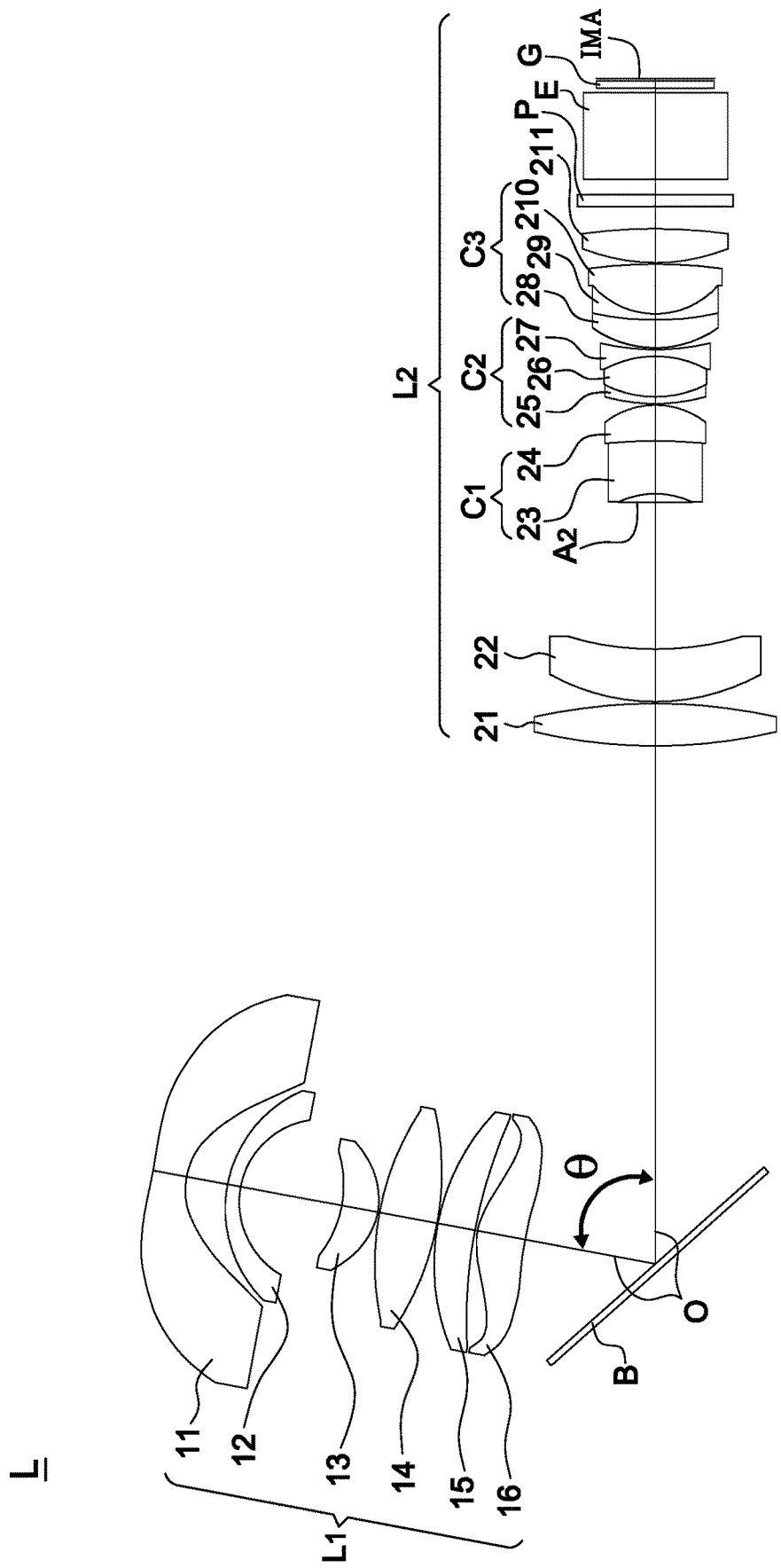
FIG. 3A is a schematic diagram illustrating lenses arrangement of the present invention.
Figure 3B:
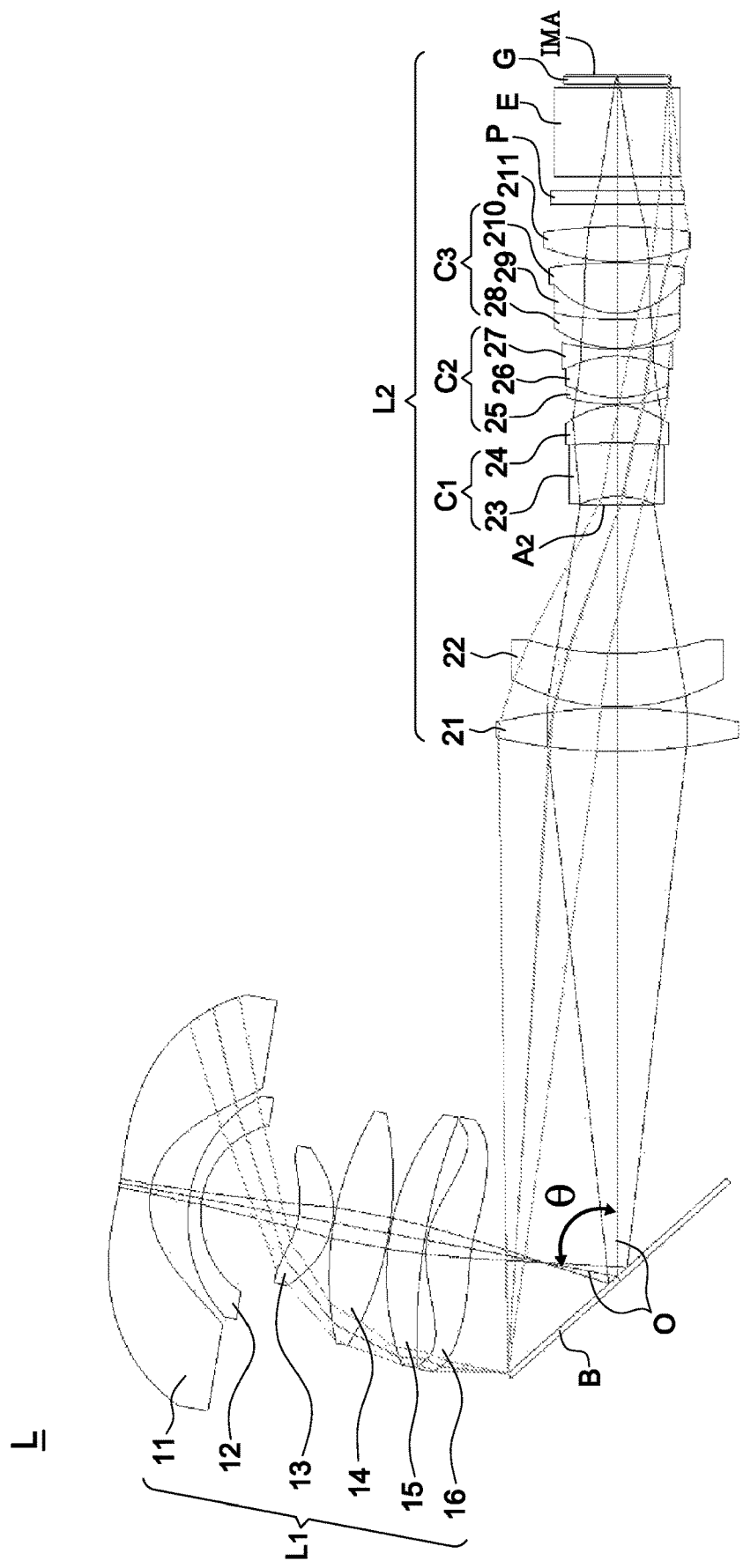
FIG. 3B is a schematic diagram illustrating a travel path of light beams through the present invention.

Referring to FIGS. 3A and 3B, operation of the reflector B is combined with the long-focus and short-focus lenses $L_2$, $L_1$, and the short-focus lens $L_1$ is omitted when combined; consequently the thickness of the image inputting surface $12R_2$ of the second lens 12 of the short-focus lens $L_1$ is corrected from 10.00 mm to 15.84 mm and the long-focus lens $L_2$ is kept for forming the projection system L. In the embodiment, the optical axis O is reflected and the direction thereof is changed at an angle less than or equal to 90°.

Figure 4:
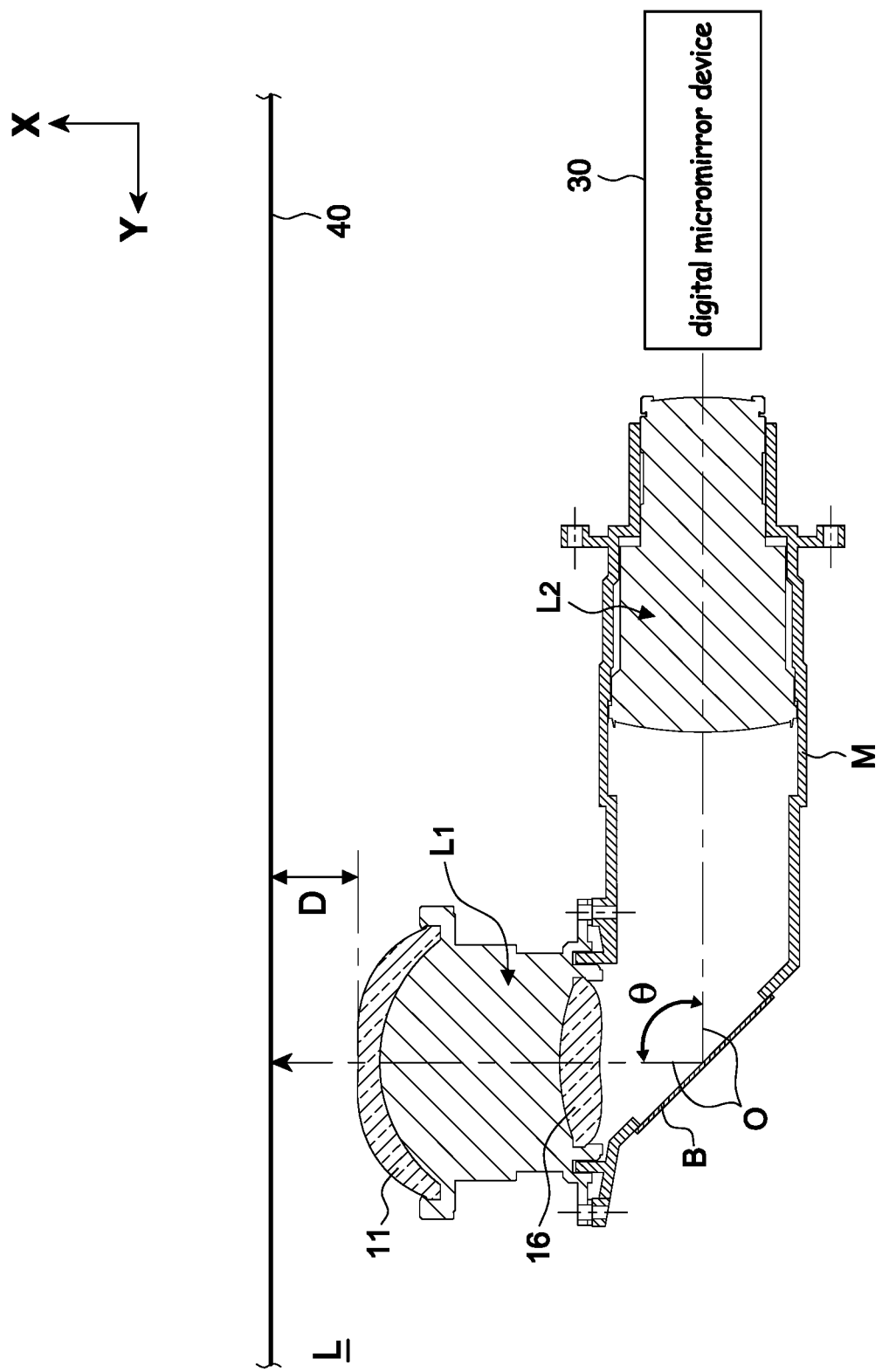
FIG. 4 is a sectional view of the present invention performing projection.

Referring to FIG. 4, the digital micromirror device 30 is integrated with the projection system L so that when the digital micromirror device 30 produces an image by the long-focus lens $L_2$, the produced image can be the image source for the short-focus lens $L_1$; the short-focus lens $L_1$ then produces an image to a screen 40. The direction of the optical axis O can be adjusted by the reflector B to make a better arrangement of the projection system L with a super short projection distance D between the screen 40 and the short-focus lens $L_1$.

Figure 5A:
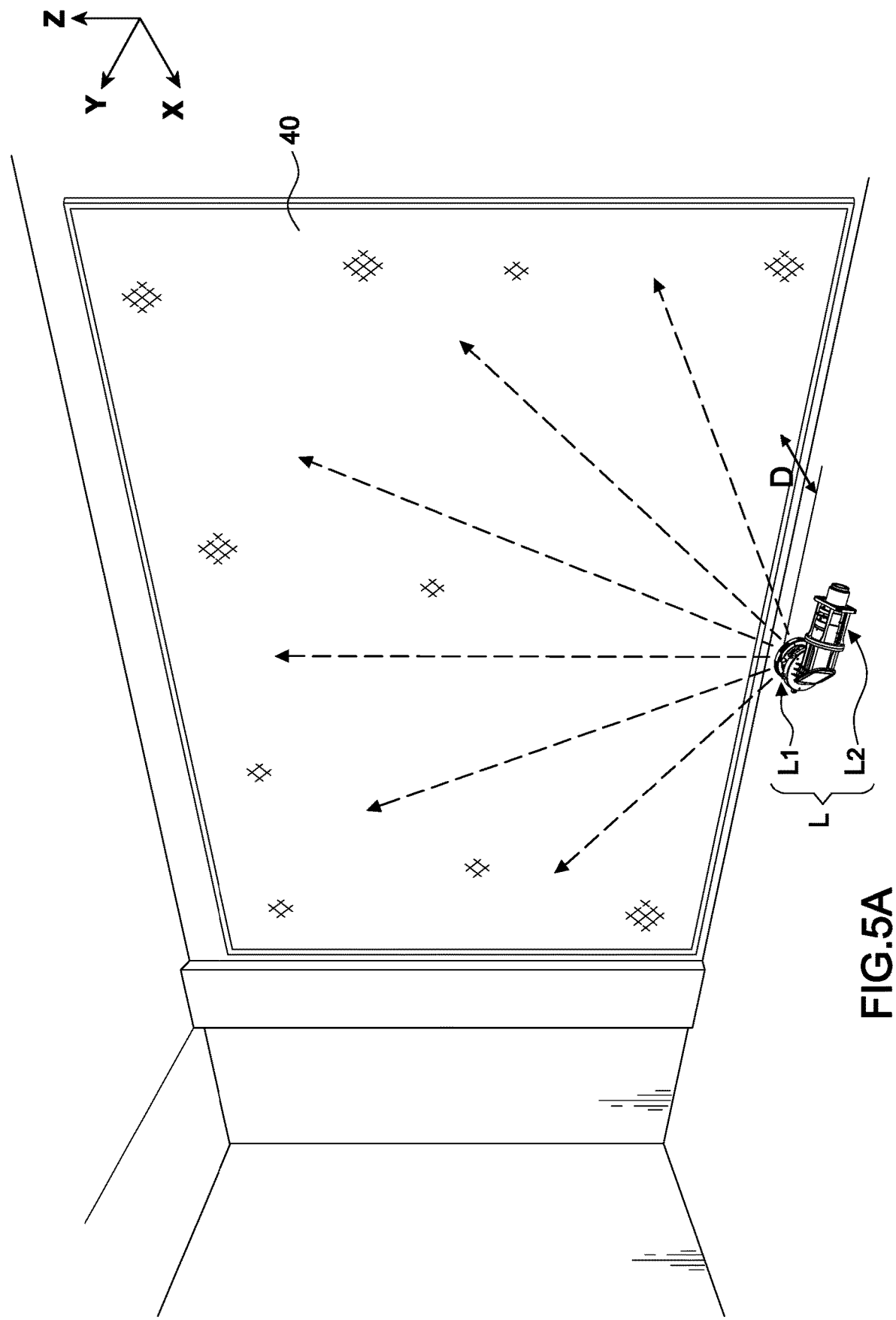
FIG. 5A is a schematic diagram illustrating the present invention performing projection.
Figure 5B:
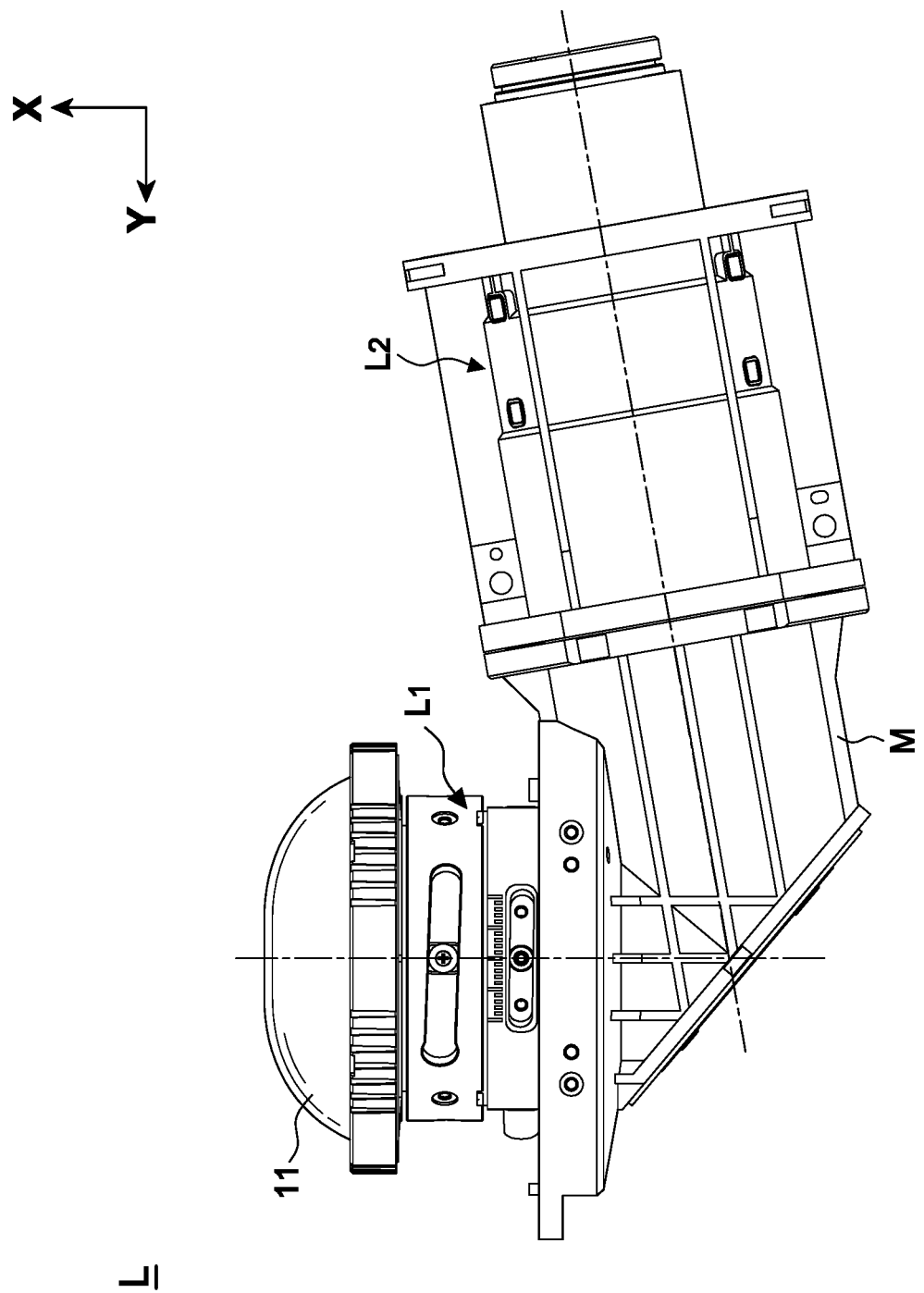
FIG. 5B is a perspective view of the present invention.
Figure 6A:
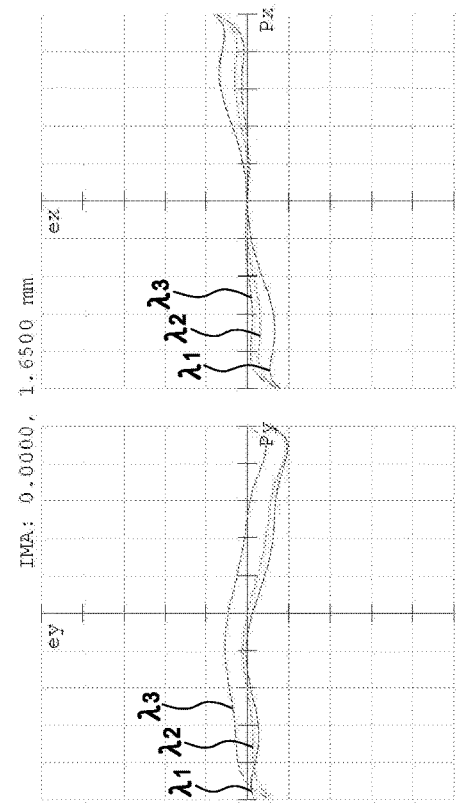
FIG. 6A is a transverse ray fan plot with an image height of 0.5840 mm according to the present invention.
Figure 6B:
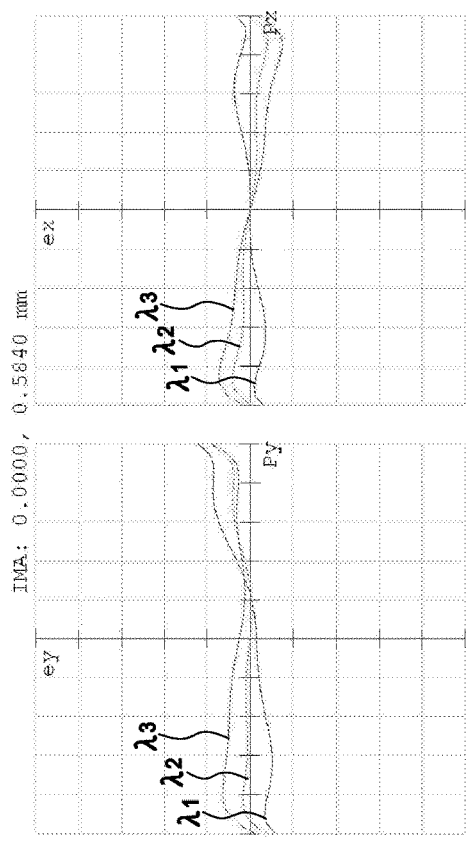
FIG. 6B is a transverse ray fan plot with an image height of 1.6500 mm according to the present invention.
Figure 6D:
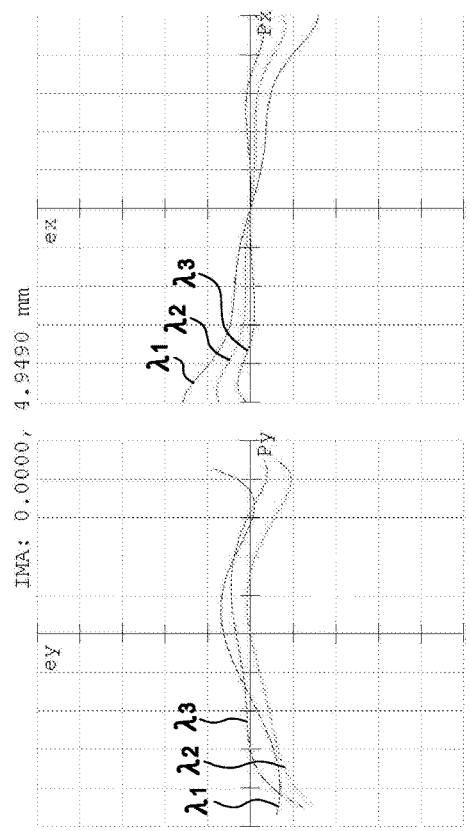
FIG. 6D is a transverse ray fan plot with an image height of 4.9490 mm according to the present invention.
Figure 6C:
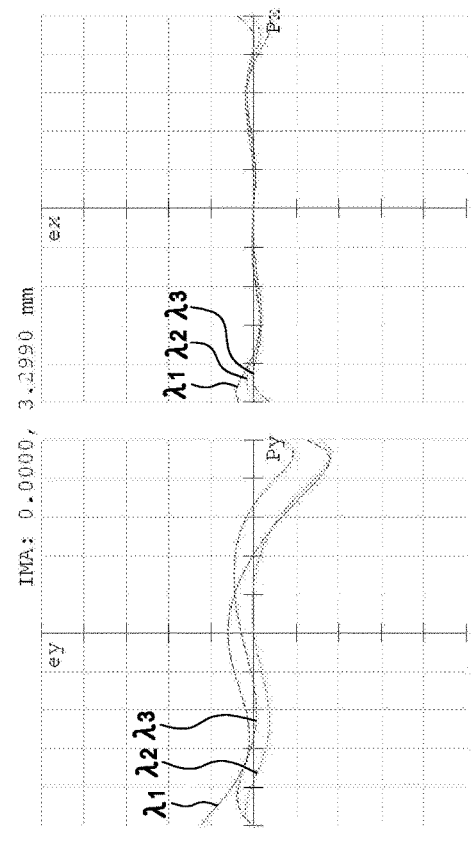
FIG. 6C is a transverse ray fan plot with an image height of 3.2990 mm according to the present invention.
Figure 6F:
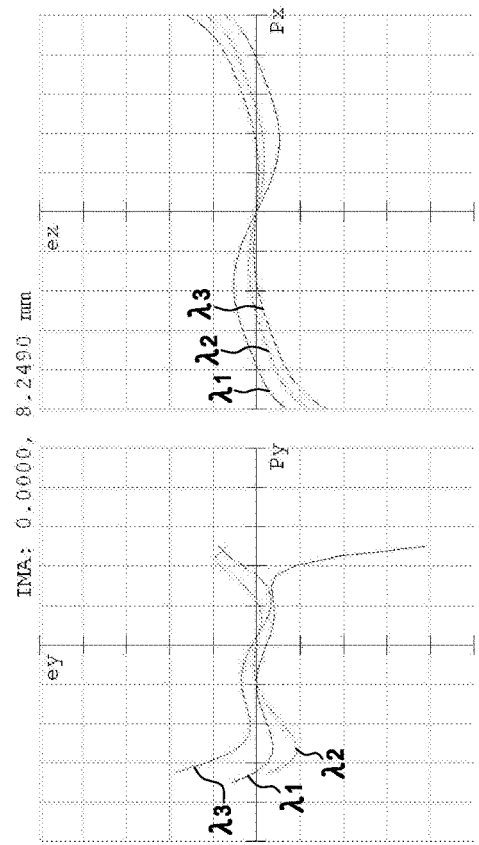
FIG. 6F is a transverse ray fan plot with an image height of 8.2490 mm according to the present invention.
Figure 6E:
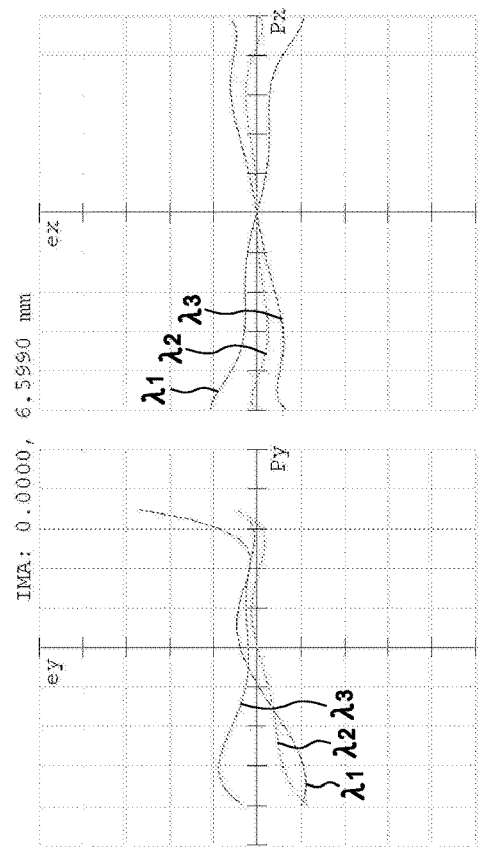
FIG. 6E is a transverse ray fan plot with an image height of 6.5990 mm according to the present invention.

Referring to FIG. 5A, the projection system L is parallel with the screen 40 along a Z-axis direction and has the long-focus and short-focus lenses $L_2$, $L_1$ coordinated to perform projection to the screen 40 within the super short projection distance D. Further referring to FIG. 5B, the housing case M is assembled according to the positions of the long-focus lens $L_2$, the reflector B and the short-focus lens $L_1$ to form an integrated structure inside the digital micromirror device 30.

Figure 7:
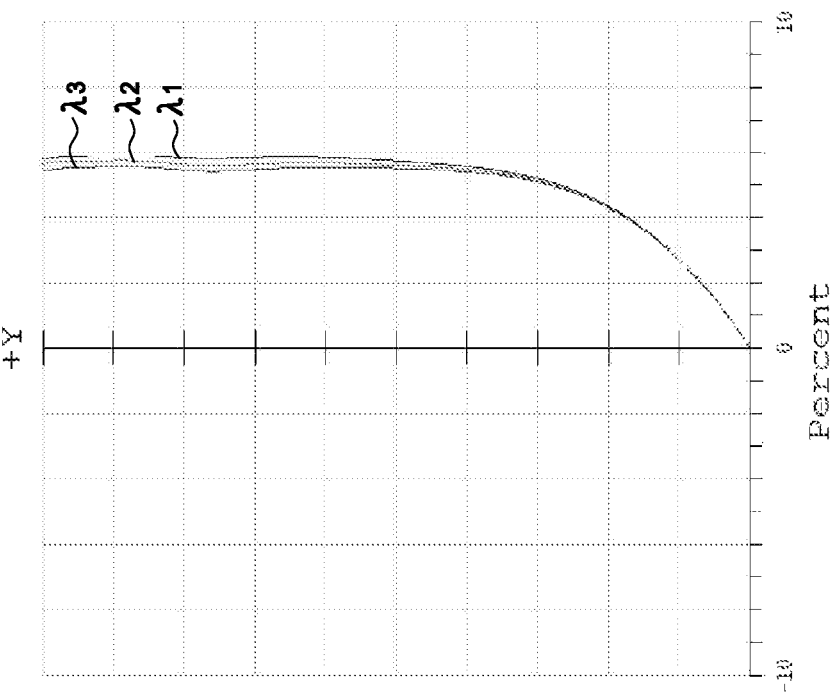
FIG. 7 is a field curvature diagram of the present invention.
Figure 8:
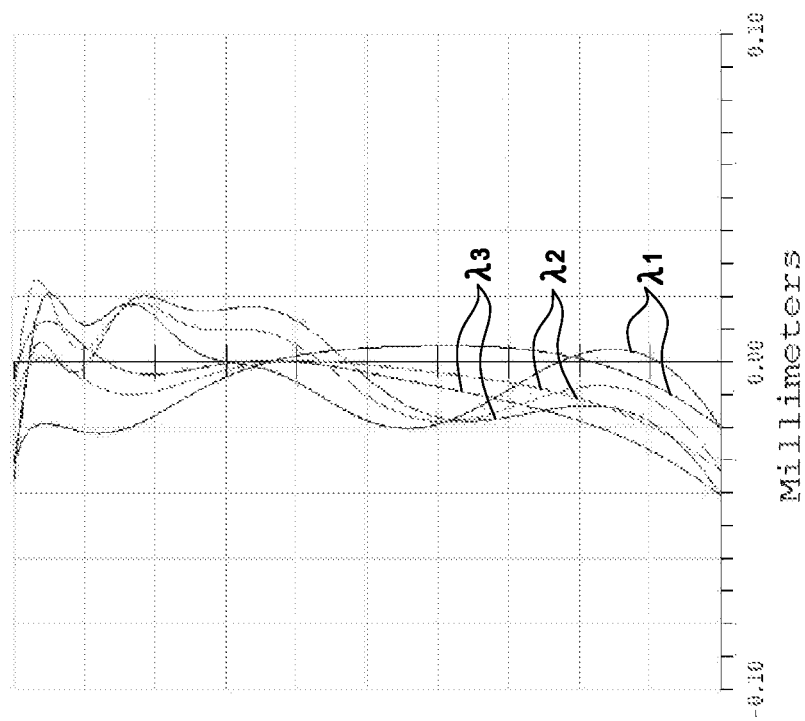
FIG. 8 is a distortion diagram of the present invention.
Figure 10:
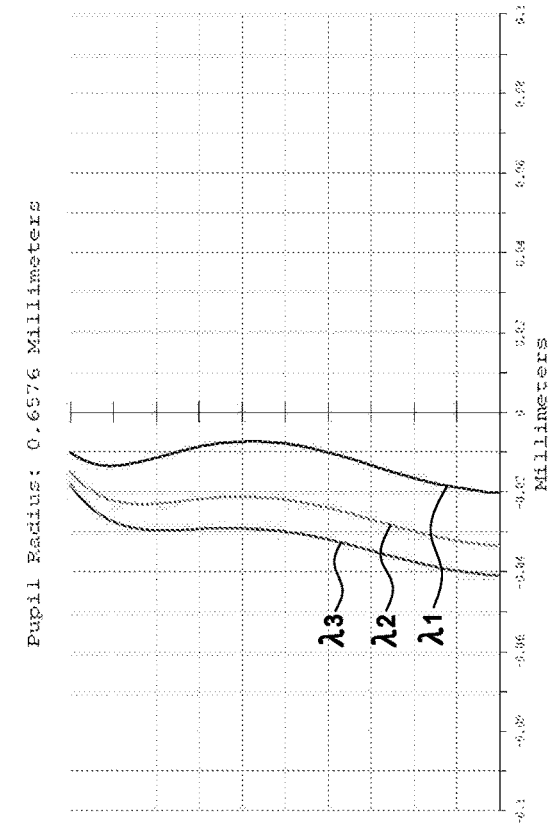
FIG. 10 is a longitudinal aberration of the present invention.
Figure 9:
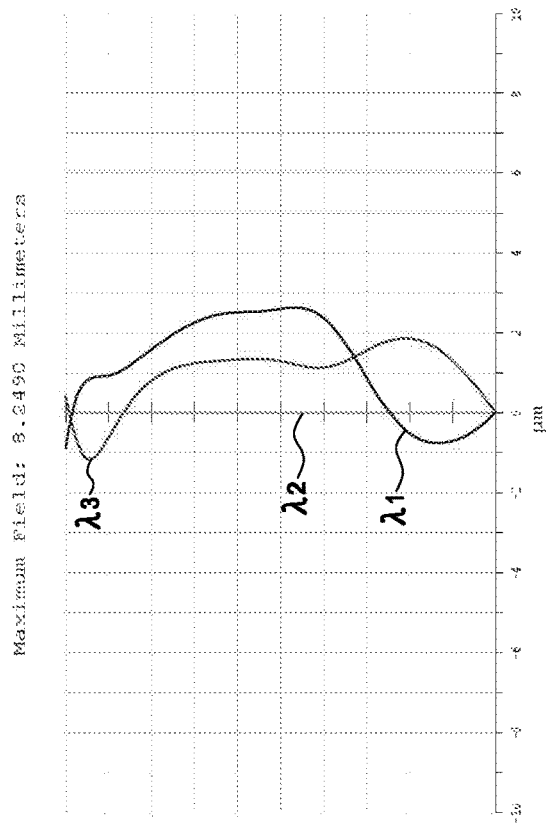
FIG. 9 is a transverse chromatic aberration of the present invention.

With structures disclosed above, the projection system L has a first wavelength $\lambda_1$ set as 0.450 um, a second wavelength $\lambda_2$ set as 0.540 um and a third wavelength $\lambda_3$ set as 0.630 um; thereby it is able to simulate different transverse ray fan plots as shown in FIGS. 6A-6F and to display images with respective image heights of 0.5840 mm, 1.6500 mm, 3.2990 mm, 4.9490 mm, 6.5990 mm and 8.2490 mm on the image IMA. The transverse aberration of a Y-axis is represented by ey. The pupil height of the Y-axis is represented by py. The transverse aberration of an X-axis is represented by ex. The pupil height of the X-axis is represented by px. The maximum of the transverse aberration of the X-axis and the Y-axis is ±20.000 um and the pupil heights of the X-axis and the Y-axis are in normalized proportion. A maximum field of FIGS. 7 and 8 is 71.900°, and the one of FIG. 9 is 8.2490 μm. A pupil radius of FIG. 10 is 0.6576 mm. The data above also proves that the present invention is able to maintain a good image quality within the super short projection distance D.

Although particular embodiment of the invention has been described in detail for purposes of illustration, various modifications and enhancements may be made without departing from the spirit and scope of the invention. Accordingly, the invention is not to be limited except by the appended claims.

What is claimed is:

1. A projection system, comprising:
   a long-focus lens able to generate an image and having a focal length ranging from 70 to 300 mm, said long-focus lens having an f-number between 1.7-2.0;
   a short-focus lens able to generate an image and having a focal length ranging from 3 to 8 mm, said short-focus lens sharing an optical axis with said long-focus lens; and
   at least one reflector to change a direction of said optical axis, thereby said long-focus lens generating an image and then said short-focus lens generating said image to a pre-determined position.

2. The projection system as claimed in claim 1, wherein the optical axis is reflected by the reflector with an angle less than or equal to 90°.

3. The projection system as claimed in claim 1, wherein the short-focus lens includes a plurality of lenses from a first lens to a last lens, both the first and the last lenses being aspheric lenses.

4. The projection system as claimed in claim 3, wherein the short-focus lens includes a second lens, a third lens, a fourth lens and a fifth lens between the first lens and the last lens, said first lens having a refraction rate of 1.53 and an Abbe number of 56.3 and further having a projecting surface with a radius of –38.79 mm and a thickness of 5.00 mm and an image inputting surface with a radius of 12.68 mm and a thickness of 6.25 mm, said second lens having a refraction rate of 1.92 and an Abbe number of 18.9 and further having a projecting surface with a radius of 20.59 mm and a thickness of 2.00 mm and an image inputting surface with a radius of 13.60 mm and a thickness of 15.48 mm, said third lens having a refraction rate of 1.69 and an Abbe number of 52.7 and further having a projecting surface with a radius of –11.30 mm and a thickness of 5.46 mm and an image inputting surface with a radius of –12.01 mm and a thickness of 0.20 mm, said fourth lens having a refraction rate of 1.50 and an Abbe number of 81.6 and further having a projecting surface with a radius of 46.03 mm and a thickness of 8.88 mm and an image inputting surface with a radius of –46.03 mm and a thickness of 0.20 mm, said fifth lens having a refraction rate of 1.85 and an Abbe number of 23.8 and further having a projecting surface with a radius of 36.91 mm and a thickness of 5.57 mm and an image inputting surface with a radius of 84.40 mm and a thickness of 0.38 mm, said last lens having a refraction rate of 1.53 and an Abbe number of 56.3 and further having a projecting surface with a radius of 11.91 mm and a thickness of 7.20 mm and an image inputting surface with a radius of 28.68 mm and a thickness of 11.85 mm.

5. The projection system as claimed in claim 1, wherein the long-focus lens includes an aperture stop, at least a first doublet and at least a second doublet, said at least one first and one second doublet disposed at a rear side of said long-focus lens.

6. The projection system as claimed in claim 5, wherein the long-focus lens has a first lens and a second lens disposed at a front side thereof; the first doublet includes a third lens and a fourth lens of the long-focus lens; the second doublet includes a fifth lens, a sixth lens and a seventh lens of the long-focus lens and has a third doublet disposed at a rear side of the second doublet, said third doublet including an eighth lens, ninth lens and a tenth lens of said long-focus lens and further having an eleventh lens of said long-focus lens disposed at a rear side of said third doublet, said first lens having a refraction rate of 1.77 and an Abbe number of 49.6 and further having a projecting surface with a radius of 88.32 mm and a thickness of 6.50 mm and an image inputting surface with a radius of –88.32 mm and a thickness of 0.20 mm, said second lens having a refraction rate of 1.85 and an Abbe number of 23.8 and further having a projecting surface with a radius of 36.00 mm and a thickness of 8.00 mm and an image inputting surface with a radius of 49.65 mm and a thickness of 22.20 mm, said third lens having a refraction rate of 1.83 and an Abbe number of 37.2 and further having a projecting surface with a radius of –15.28 mm and a thickness of 8.00 mm, said fourth lens having a refraction rate of 1.51 and an Abbe number of 63.9 and further having a projecting surface with a radius of –97.90 mm and a thickness of 5.55 mm and an image inputting surface with a radius of –12.89 mm and a thickness of 0.20 mm, said fifth lens having a refraction rate of 1.85 and an Abbe number of 23.8 and further having a projecting surface with a radius of 32.49 mm and a thickness of 1.00 mm, said sixth lens having a refraction rate of 1.50 and an Abbe number of 81.6 and further having a projecting surface with a radius of 18.18 mm and a thickness of 6.25 mm, said seventh lens having a refraction rate of 1.81 and an Abbe number of 25.5 and further having a projecting surface with a radius of −18.18 mm and a thickness of 1.00 mm and an image inputting surface with a radius of 37.03 mm and a thickness of 0.20 mm, said eighth lens having a refraction rate of 1.50 and an Abbe number of 81.6 and further having a projecting surface with a radius of 17.75 mm and a thickness of 4.28 mm, said ninth lens having a refraction rate of 1.81 and an Abbe number of 25.5 and further having a projecting surface with a radius of 49.08 mm and a thickness of 1.00 mm, said tenth lens having a refraction rate of 1.50 and an Abbe number of 81.6 and further having a projecting surface with a radius of 13.84 mm and a thickness of 7.58 mm and an image inputting surface with a radius of −79.84 mm and a thickness of 0.20 mm, said eleventh lens having a refraction rate of 1.92 and an Abbe number of 18.9 and further having a projecting surface with a radius of 33.66 mm and a thickness of 5.22 mm and an image inputting surface with a radius of −85.20 mm and a thickness of 3.35 mm.

7. The projection system as claimed in claim 1, wherein the short-focus lens has a maximum angle of view less than or equal to 130°.

8. The projection system as claimed in claim 1, wherein a digital micromirror device is further combined with the projection system for the digital micromirror device to generate an image by the long-focus lens and to be a source of image for the short-focus lens by the generated image.

9. The projection system as claimed in claim 8, wherein the reflector is disposed correspondingly to a length or a width of the digital micromirror device.

10. A projection system, comprising:
a long-focus lens able to generate an image and having a focal length ranging from 70 to 300 mm, said long-focus lens has an optical magnification between 1.5-2.5;
a short-focus lens able to generate an image and having a focal length ranging from 3 to 8 mm, said short-focus lens sharing an optical axis with said long-focus lens; and
at least one reflector to change a direction of said optical axis, thereby said long-focus lens generating an image and then said short-focus lens generating said image to a pre-determined position.

11. A projection system, comprising:
a long-focus lens able to generate an image and having a focal length ranging from 70 to 300 mm, said long-focus lens including an aperture stop, at least a first doublet and at least a second doublet, said at least one first and one second doublet being disposed at a rear side of said long-focus lens;
a short-focus lens able to generate an image and having a focal length ranging from 3 to 8 mm, said short-focus lens sharing an optical axis with said long-focus lens; and
at least one reflector to change a direction of said optical axis, thereby said long-focus lens generating an image and then said short-focus lens generating said image to a pre-determined position.

* * * * *